United States Patent Office 3,356,665
Patented Dec. 5, 1967

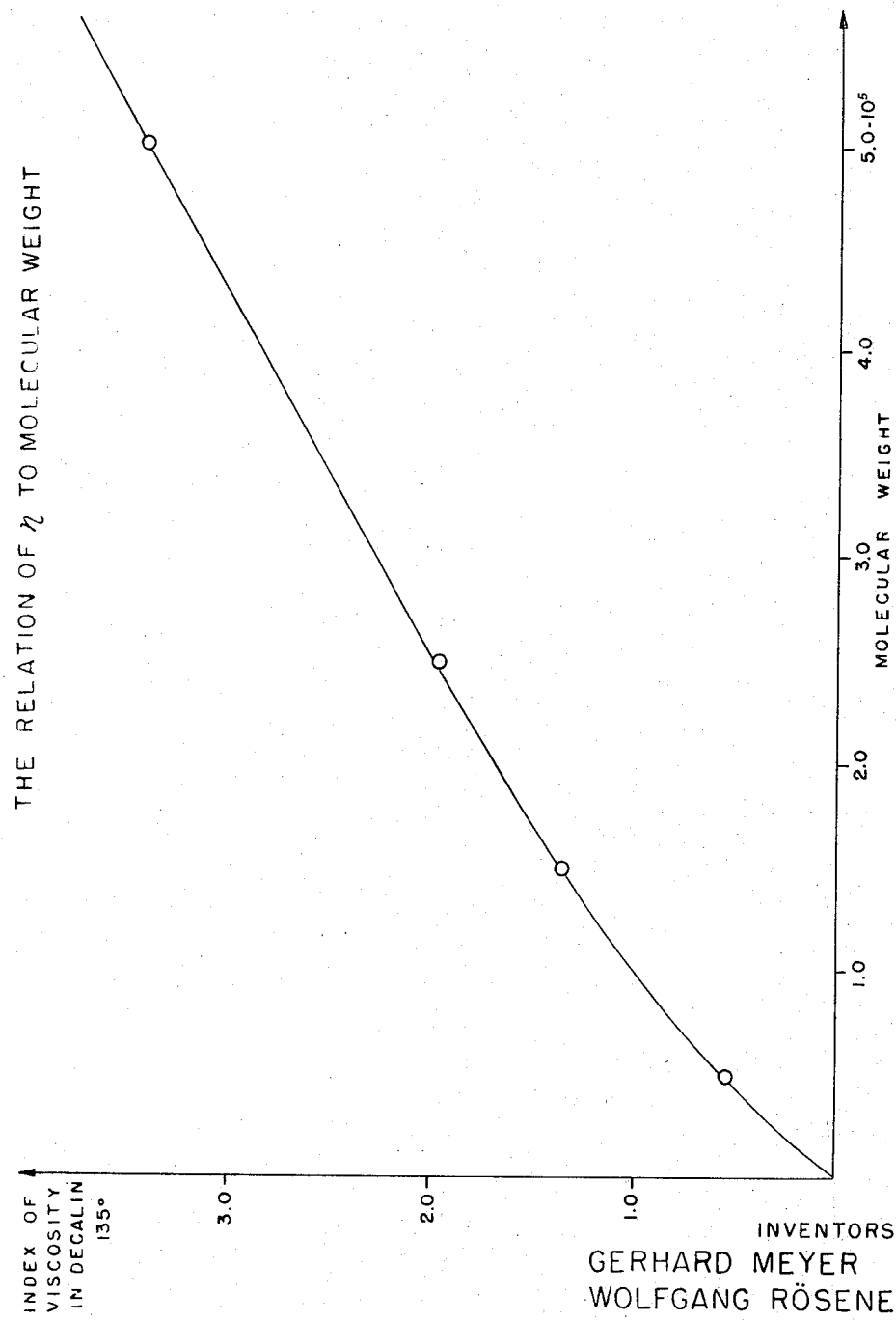

3,356,665
PROCESS FOR CONTROLLING THE MOLECULAR WEIGHT OF POLYPROPYLENE
Gerhard Meyer, Obernburg (Main), Wolfgang Rösener, Erlenbach (Main), and Erhard Siggel, Laudenbach (Main), Germany, assignors to Vereinigte Glanzstoff-Fabriken AG, Wuppertal-Elberfeld, Germany
Filed Oct. 18, 1962, Ser. No. 231,502
Claims priority, application Germany, Oct. 31, 1961, V 21,532
3 Claims. (Cl. 260—93.7)

The present invention is directed to an improved process for polymerizing olefins. More particularly, the subject invention is directed to a process for controlling the molecular weight of polyolefins produced in the polymerization of monoolefins.

The polymerization of olefins with the aid of particular catalysts in organic, and preferably aliphatic, dispersing agents is well known. In the production of linear polyolefins the so-called stereospecific catalysts are especially useful. These catalysts consist of mixtures of metal salts and metal-organic compounds. Of these compounds mixtures of titanium trichloride and aluminum trialkyls have become of greatest importance. The polyolefins which are produced with the aid of these catalyst mixtures have a very high molecular weight and are distinguished by a high content of isotactic polymer molecules. These isotactic polymerizates, unlike amorphous low-molecular constituents (likewise contained in the precipitated polymerizate) are not soluble in conventional extraction agents (such as heptane) which are used for the purification of the polymers. Although the properties of isotactic polyolefins are much desired, especially where the polymers are to be processed into threads or films, difficulties of considerable magnitude are caused by the high molecular weight and high melt viscosity of the products. These problems are well known in the art and various solutions have been proposed which attempt to produce or to treat polyolefins in such a manner that they can be processed in known melt-spinning apparatus.

In one of the prior art processes, a thermal decomposition is carried out ahead of or within the melting apparatus. This method makes necessary an additional step in the process. Furthermore, the thermal treatment causes not only a decomposition of the polymer molecules but also simultaneous damage to the product as, for example, the reduction of the temperature stability and strength of the polymerizate. The thermal decomposition also has a harmful effect on the color of the product.

In another known process, an attempt is made to control the viscosity of the polymerizate by carrying out the polymerization step in the presence of hydrogen or alkyl halides. Although polymerizates with lower viscosities are produced by this process, the proportion of extractable components is increased and, accordingly, the yield of isotactic polymerizate is lowered.

It has also been proposed that polyolefins with lower molecular weights can be produced if the polymerization is carried out in the presence of metal compounds of the second subgroup of the Periodic System such as zinc, cadmium or mercury alkyls, these compounds being used simultaneously with the above mentioned stereospecific catalysts. If the polymerization is carried out according to this process, for example, with the addition of zinc diethyl, the claimed effect, however, does not occur. No lowering of the molecular weight or viscosity of the polyolefin takes place in comparison with a polymerizate which is produced without the use of zinc diethyl. This can be explained by the fact that zinc diethyl is monomolecular and nonpolar, and therefore electrically neutral in the anhydrous inert hydrocarbons which are used in the polymerization of olefins. The polymerization, as is well known, proceeds according to an ionic mechanism, namely, in the presence of an anionic catalyst. It is self-evident that the nonpolar zinc diethyl cannot participate in the reaction and, accordingly, cannot influence the properties of the polymerization products. The use of cadmium or mercury alkyls is not feasible because these compounds are too expensive for a commercial operation.

It is an object of the present invention to provide a process for polymerizing olefins wherein the molecular weight of the polymerizate can be controlled.

A further object of the invention is to provide a relatively inexpensive and highly effective process for producing a product having a high content of isotactic polymerizate as well as a polyolefin having a satisfactory molecular weight and viscosity.

Other objects will become apparent to those skilled in the art from the following detailed description of the invention.

In general, the present invention comprises the discovery that it is possible to control the molecular weight of polyolefins if the polymerization is carried out in the presence of organic aluminum compounds, titanium trichloride, zinc diethyl, and with the addition of any compounds which form complexes with zinc diethyl. Suitable complex-forming compounds include, for example, ethyl iodide, diethyl ether, pyridine, lithium butyl, aluminum chloride, aluminum bromide, tetra-n-butyl ammonium iodide, tetra-n-hexyl ammonium bromide, tetra-n-butyl phosphonium bromide, triethylamine, dimethylaniline, diisoamyl sulfide. The amount of complex-forming compound that is added to the reaction mixture can vary from about 4 to about 10 mol percent with reference to the zinc diethyl. The molar ratio of zinc diethyl to titanium trichloride lies between 0.2 to 1 and 4 to 1, and preferably between 1 to 1 and 3 to 1.

The use of the compounds which form complexes with zinc diethyl makes it possible to reduce considerably the viscosity of the resulting polyolefin. Depending upon the amount of zinc diethyl and of the complex-forming material and according to the type of complex-forming compound the viscosity of the polyolefin can be reduced, for example, to one-half the value that the polyolefin would have had by polymerizing in the known manner with titanium trichloride, aluminum trialkyl, and zinc diethyl. A special advantage of the subject process lies in the fact that the proportion of isotactic polymerizate with respect to the products which are produced in the polymerization is not reduced by the use of the subject zinc diethyl complex-forming compounds.

The effect of the complexing agent (ethyl iodide) on the zinc diethyl can be illustrated by the following equation. (See G. Jander and L. Fischer, Zeitschrift fur Elektrochemie (1958), page 965):

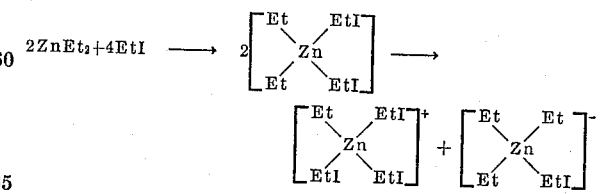

The zinc complexes split according to the reaction diagram into a cation and an anion, and these ions can engage in the polymerization reaction and terminate the growth of the chains.

The process according to the invention is explained in detail in the following example.

Example I

In an enameled agitator autoclave with a useful content of 150 liters, there are placed (with the exclusion of moisture and air), 105 liters of n-heptane. Aluminum triethyl is then dissolved in 5 liters of n-heptane and this solution is added to the autoclave, heated to 75° C. and agitated for 30 minutes. Thereupon, titanium trichloride which has been produced by reduction of titanium tetrachloride with hydrogen at 800° C. and purified by repeated washing with n-heptane, is worked into a paste with 5 liters of n-heptane and passed into the autoclave along with a solution of zinc diethyl and a complex-former (in this case, ethyl iodide) in 5 liters of n-heptane. Thereupon, propylene is injected into the autoclave under a pressure of 4 atmospheres excess pressure and with agitation. The pressure is maintained until a polymerizate concentration of 23% is reached. The polymerizate is then worked up in the usual manner and dried. The polypropylene is subjected to an extraction with boiling n-heptane. The extraction residue, which consists of isotactic polypropylene, is dried. The determination of the viscosity of the polypropylene is accomplished by the method of (1) Ubbelohde, Handbuch der Chemie und Technologie der Ole und Fette (Handbook of the chemistry and technology of oils and fats), Leipzig 1908, vol. 1, page 340;
(2) Holde, Hydrocarbon Oils and Fats (Kohlenwasserstoffole und Fette), 7th edition (printing), Berlin 1933, page 16;
(3) Wesslau, H. Makromolekulare Chemie (Macromolecular Chemistry), vol. 20 (1956), page 111.

The measurement is carried out with a 0.1% solution in decalin at 135° C. The amounts of the individual components are apparent from the above tabular compilation. Instead of n-heptane, in various experiments, hexane is used.

The examples make clearly apparent the improvement obtainable by the process of the invention and show, furthermore, that the addition of zinc diethyl alone does not cause any effect whatsoever (cf. Examples 13 to 15 and 16 or 17).

The molecular weights of the isotactic polypropylene can be taken from the attached drawing with the aid of the viscosity values of the table, which diagram gives the relation of viscosity and molecular weight, calculated according to P. Parrini (Makromol. Chem., vol. 38 (1960), page 27).

Obviously many modifications and variations of the invention as hereinbefore set forth may be made without departing from the spirit and scope thereof, and therefore only such limitations should be imposed as are indicated in the appended claims.

We claim:

1. The process for controlling the molecular weight of polypropylene produced by the polymerization of propylene in inert hydrocarbons with the use of an aluminum trialkyl, titanium trichloride, and zinc diethyl, the improvement which comprises: placing in contact with the propylene to be polymerized a compound which complexes with zinc diethyl, said compound being selected from the group consisting of ethyl iodide, diethyl ether, lithium butyl, aluminum chloride, and aluminum bromide, the amount of complex-forming compounds being from about 4 to 10 mols per 100 mols of zinc diethyl.

2. The process for controlling the molecular weight of polypropylene produced by the polymerization of propylene in inert hydrocarbons with the use of an aluminum trialkyl, titanium trichloride, and zinc diethyl, the improvement which comprises: placing in contact with the propylene to be polymerized a compound which complexes with zinc diethyl, said compound being selected from the group consisting of ethyl iodide, diethyl ether, lithium butyl, aluminum chloride, and aluminum bromide, the molecular ratio of zinc diethyl to titanium trichloride being between about 0.2:1 and about 4:1, and the amount of complex-forming compounds being from about 4 to 10 mols per 100 mols of zinc diethyl.

3. A process as in claim 2 wherein the complex-forming compound is ethyl iodide.

| Experiment | $TiCl_3$, Mol/l.* $\times 10^{-3}$ | $Al(C_2H_5)_3$, Mol/l.* $\times 10^{-3}$ | $Zn(C_2H_5)_2$, Mol/l.* $\times 10^{-3}$ | Complex-former, Mol percent with reference to $ZnEt_2$ | n-Heptane extract | Isotactic polypropylene, percent | Viscosity of polymerizate | Solvent for the polymerization |
|---|---|---|---|---|---|---|---|---|
| 1 | 4.06 | 8.80 | 8.50 | 7.31 Ethyl iodide | 15.0 | 85.0 | 1.94 | Heptane. |
| 2 | 4.06 | 5.49 | 5.40 | 3.74 Ethyl iodide | 18.9 | 81.1 | 2.40 | Do. |
| 3 | 4.06 | 8.80 | 8.50 | 3.85 Ethyl iodide | 18.2 | 81.8 | 1.74 | Do. |
| 4 | 3.90 | 7.90 | 7.30 | 7.24 Ethyl iodide | 19.9 | 80.1 | 1.62 | Hexane. |
| 5 | 4.06 | 8.80 | 8.50 | 7.31 Diethyl ether | 16.8 | 83.2 | 2.02 | Heptane. |
| 6 | 4.06 | 8.80 | 8.50 | 4.82 Diethyl ether | 25.0 | 75.0 | 1.99 | Do. |
| 7 | 4.06 | 8.80 | 8.50 | 7.31 Pyridine | 18.7 | 82.3 | 1.84 | Do. |
| 8 | 2.70 | 5.50 | 7.60 | 5.35 Pyridine | 15.6 | 84.4 | 1.97 | Hexane. |
| 9 | 4.06 | 8.80 | 8.50 | 6.28 Lithium butyl | 21.3 | 78.7 | 2.05 | Heptane. |
| 10 | 4.06 | 8.80 | 8.50 | 7.31 Aluminum chloride | 26.7 | 73.3 | 1.76 | Do. |
| 11 | 2.70 | 5.50 | 7.60 | 5.35 Aluminum chloride | 24.4 | 75.6 | 1.52 | Do. |
| 12 | 4.06 | 8.80 | 8.50 | 7.31 Aluminum bromide | 26.4 | 73.6 | 1.87 | Hexane. |
| 13 | 2.70 | 5.50 | 7.60 | Control | 24.4 | 75.6 | 4.44 | Heptane. |
| 14 | 4.06 | 8.80 | 8.50 | do | 19.8 | 80.2 | 4.45 | Do. |
| 15 | 3.25 | 5.48 | 7.61 | do | 23.1 | 76.9 | 4.77 | Hexane. |
| 16 | 2.70 | 7.32 | | do | 24.2 | 75.8 | 4.97 | Heptane. |
| 17 | 2.70 | 7.32 | | do | 19.9 | 80.1 | 4.88 | Hexane. |

*With reference to the solvent.
NOTE.—Experiments 13 to 17 are control examples.

References Cited

UNITED STATES PATENTS 2,971,925  2/1961  Winkler et al. _____ 260—94.945
3,072,630  1/1963  De Jong et al. _____ 260—94.93
3,177,195  4/1965  Steity _____ 260—94.9
3,245,973  4/1966  Natta et al. _____ 260—93.7

FOREIGN PATENTS 880,747  10/1961  Great Britain.

JOSEPH L. SCHOFER, *Primary Examiner.*

F. L. DENSON, *Assistant Examiner.*